(12) United States Patent
Kudo et al.

(10) Patent No.: US 7,664,859 B2
(45) Date of Patent: Feb. 16, 2010

(54) RESOURCE ASSIGNING MANAGEMENT APPARATUS AND RESOURCE ASSIGNING METHOD

(75) Inventors: Yutaka Kudo, Yokohama (JP); Futoshi Haga, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 631 days.

(21) Appl. No.: 11/362,082

(22) Filed: Feb. 27, 2006

(65) Prior Publication Data
US 2006/0224706 A1 Oct. 5, 2006

(30) Foreign Application Priority Data
Mar. 30, 2005 (JP) .............................. 2005-097096

(51) Int. Cl.
*G06F 15/173* (2006.01)
(52) U.S. Cl. ...................... 709/226; 709/223; 709/224; 709/225
(58) Field of Classification Search ................. 709/220, 709/223, 224
See application file for complete search history.

(56) References Cited

U.S. PATENT DOCUMENTS

| | | | |
|---|---|---|---|
| 5,799,173 A * | 8/1998 | Gossler et al. ................. 703/21 |
| 5,983,281 A * | 11/1999 | Ogle et al. ................... 709/249 |
| 6,195,680 B1 * | 2/2001 | Goldszmidt et al. ......... 709/203 |
| 6,259,705 B1 * | 7/2001 | Takahashi et al. ............ 370/465 |
| 6,425,007 B1 * | 7/2002 | Messinger ................... 709/224 |
| 6,438,595 B1 * | 8/2002 | Blumenau et al. ........... 709/226 |
| 6,671,259 B1 * | 12/2003 | He et al. ..................... 370/238 |
| 6,745,241 B1 * | 6/2004 | French et al. ................ 709/221 |
| 6,880,156 B1 * | 4/2005 | Landherr et al. ............. 718/105 |
| 7,080,378 B1 * | 7/2006 | Noland et al. ............... 718/104 |
| 2005/0021530 A1 * | 1/2005 | Garg et al. ................... 707/100 |
| 2005/0102398 A1 * | 5/2005 | Zhang et al. ................. 709/225 |
| 2005/0193113 A1 * | 9/2005 | Kokusho et al. ............. 709/225 |

FOREIGN PATENT DOCUMENTS

| | | |
|---|---|---|
| JP | 2001-331332 | 11/2001 |
| JP | 2002-183106 | 6/2002 |
| WO | WO2004/092971 | 10/2004 |

* cited by examiner

*Primary Examiner*—Hussein Elchanti
(74) *Attorney, Agent, or Firm*—Mattingly & Malur, PC

(57) ABSTRACT

In a system which divides requests to an application, into computers on which the application is operating, computers are managed so as to prevent the lowering of the service level of each application. The resource assigning management apparatus 1 subtracts a total number of request counts (receive request count) received per unit tame by each server computer which is assigned to the application, from the total number of requests processible per unit time by each server computer 3 which is assigned to the application (request processible count), and calculates a resource amount available from the application to another application. Then, allocation of at least one server computer 3 that is assigned to the resource-excessive application is changed to an application which is lacking resources.

7 Claims, 11 Drawing Sheets

FIG. 2

APPLICATION CONFIGURATION MANAGEMENT TL 131

| APPLICATION ID | SERVICE TYPE | FUNCTION | MODULE ID | MULTIPLEXING | PROCESSIBLE COUNT (counts/(min·unit)) |
|---|---|---|---|---|---|
| APP_01 | WEB-BASED SHOPPING | WEB SERVER | WEB-01 | OK | 20 |
| APP_01 | WEB-BASED SHOPPING | DATABASE | DB-01 | NO | 180 |
| APP_02 | WEB-BASED CATALOGUE DISTRIBUTION | WEB SERVER | WEB-02 | OK | 50 |
| APP_03 | WEB-BASED CATALOGUE DISTRIBUTION | WEB SERVER | WEB-03 | OK | 32 |
| APP_04 | WEB-BASED CATALOGUE DISTRIBUTION | WEB SERVER | WEB-03 | OK | 40 |
| ... | ... | ... | ... | ... | ... |

FIG. 3

RESOURCE MANAGEMENT TL 132

| COMPUTER ID | APPLICATION ID | MODULE ID |
|---|---|---|
| M_001 | APP_01 | WEB_01 |
| M_002 | APP_01 | WEB_01 |
| M_003 | APP_01 | WEB_01 |
| M_004 | APP_01 | WEB_01 |
| M_005 | APP_01 | DB_01 |
| ⋮ | ⋮ | ⋮ |
| M_100 | NOT YET ASSIGNED | NOT YET ASSIGNED |

FIG. 4

METRIC INFORMATION MANAGEMENT TL 133

| COMPUTER ID | APPLICATION ID | MODULE ID | METRIC INFORMATION — RECEIVE REQUEST COUNT (COUNT/MIN) | REGISTRATION DATE AND TIME |
|---|---|---|---|---|
| M_001 | APP_01 | WEB_01 | 40 | 2005/3/15/17:00 |
| M_002 | APP_01 | WEB_01 | 40 | 2005/3/15/17:10 |
| M_003 | APP_01 | WEB_01 | 40 | 2005/3/15/17:15 |
| M_004 | APP_01 | WEB_01 | 30 | 2005/3/15/17:20 |
| M_005 | APP_01 | DB_01 | 80 | 2005/3/15/17:20 |
| ⋮ | ⋮ | ⋮ | ⋮ | ⋮ |

FIG. 5

MARGIN RATIO MANAGEMENT TL 134

| APPLICATION ID | MODULE ID | CURRENT NUMBER OF UNITS | OPTIMUM NUMBER OF UNITS | SERVICE LEVEL MARGIN RATIO (%) | AVAILABLE NUMBER OF UNITS |
|---|---|---|---|---|---|
| APP_01 | WEB_01 | 4 | 8 | 50 | −4 |
| APP_02 | WEB_02 | 6 | 4 | 120 | 2 |
| APP_03 | WEB_03 | 5 | 4 | 125 | 1 |
| APP_04 | WEB_04 | 5 | 6 | 83 | −1 |
| ··· | ··· | ··· | ··· | ··· | ··· |

ADJUSTMENT PLAN MANAGEMENT TL 135

| COMPUTER ID 1351 | ALLOCATION SYSTEM BEFORE CHANGE 1352 | | ALLOCATION SYSTEM AFTER CHANGE 1353 | | ADJUSTMENT DATE AND TIME 1354 | REFLECTION FLAG 1355 |
|---|---|---|---|---|---|---|
| | APPLICATION ID | MODULE ID | APPLICATION ID | MODULE ID | | |
| M_020 | NOT YET ASSIGNED | NOT YET ASSIGNED | APP_01 | WEB_01 | 2005/3/15/18:00 | OFF |
| M_005 | APP_02 | WEB_02 | APP_01 | WEB_01 | 2005/3/15/18:00 | OFF |
| M_006 | APP_03 | WEB_02 | APP_01 | WEB_01 | 2005/3/15/18:00 | OFF |
| M_011 | APP_04 | WEB_03 | APP_01 | WEB_01 | 2005/3/15/18:00 | OFF |
| .... | .... | .... | .... | .... | .... | .... |

RESOURCE ASSIGNMENT MANAGEMENT APPARATUS 1

CONFIGURATION CHANGE PROCESS S13

RESOURCE ASSIGNING MANAGEMENT APPARATUS AND RESOURCE ASSIGNING METHOD

CLAIM OF PRIORITY

The present application claims priority from Japanese application P2005-097096 filed on Mar. 30, 2005, the content of which is hereby incorporated by reference into this application.

BACKGROUND OF THE INVENTION

The present invention relates to a technique to determine a computer which is to be assigned for a desired application, out of a plurality of computers.

Japanese Patent Laid-open Publication No. 2001-331332, hereinafter referred to as "Patent Document 1", discloses a technique to reserve a particular resource for a real-time application system. In this technique, there are accumulated in a database, correspondences between service levels and resource amounts of a processor, memory, and disk band, respectively. A resource amount to be assigned for the application is determined according to the resource amount associated with a service level which is requested. With this technique, it is possible to reserve resources easily without designating complicated parameters particularly, and with such reservation of resource amount, a waste thereof can be prevented.

SUMMARY OF THE INVENTION

In the meantime, at a data center, there has been established a system in which multiple applications (for example, Web service programs) are operated on at least one of multiple computers, and requests to a certain application are divided to the computers on which the application is operating. In such a system as described above, computers resources which are not assigned to the application are pooled, and those pooled computer resources are allocated to an application having a large number of transactions. Therefore, this application is allowed to operate on thus newly assigned computers with increasing the amount of resources (computers) which handle the application having the large number of transactions. With the procedure above, it is possible to prevent the lowering of a service level in the application having the large number of transactions. Here, the "service level" denotes a level of service which is rendered from a service provider to a service consumer. For example, it is represented by a time period from when the service consumer sends a request to a terminal until a time when a result to the request is given to the service consumer at the terminal. It is possible to apply the technique disclosed by the Patent Document 1 to the case where a resource (computer) is assigned to each application in the above system. However, the technique disclosed by the Patent Document 1 does not consider the following points.

(1) Pooled computer resources do not always exist.

(2) The number of requests may vary according to a type of the application, or according to timing or clock time.

Therefore, in the system where multiple applications are operating on at least one of multiple computers, and requests to an application are divided to and processed on a computer on which the application is operating, it is difficult to assign the resources efficiently, that is, without the shortage of resources, or without assigning excessive resources, if the technique disclosed by the Patent Document 1 is applied to the assignment of the resources (computers) to each application.

The present invention has been made considering the above situation, and an object of the present invention is to manage computers which are assigned to each application, in order to prevent the lowering of service level in each application, in a system where requests to the application are divided to and processed on the computers on which the application is operating.

In order to solve the above problems, the present invention calculates, with respect to each application, a difference between a service level which the application is capable of providing and a service level actually requested to the application. The difference here corresponds to a resource amount which the application is capable of providing to another application. For example, total request throughput of each computer which is assigned to an application is subtracted from a value of processing capacity of each computer which is assigned to the application, thereby calculating a resource amount which is available for provision from the application to another application. Then, at least one computer which is assigned to the application having a positive value of resource amount, i.e., having excessive resources, is changed to be assigned to an application having a negative value of resource amount, i.e., lacking resources.

The present invention is directed to a resource assigning management apparatus that determines a computer on which an application is to be operated, in a system where each of multiple applications is operated on at least one of multiple computers, and requests to the application are divided to and processed on the computers on which the application is operated, including, a processing capacity value storing means which stores, with respect to each of the applications, a processing capacity value expected when the application is operated on the computer, a request throughput storing means which stores, with respect to each of the applications, a request throughput on each of the computers which are assigned to the application, an available resource amount calculating means in which a total request throughput in each of the computers that are assigned to the application, the request throughput being stored by the request throughput storing means, is subtracted from a total processing capacity value for the application of each of the computers assigned to the application, the processing capacity value being stored by the processing capacity value storing means, and thus obtained value is set as an available resource amount from the application for another application, and a configuration changing means which changes an allocation of a computer being allocated to a resource-excessive application that has a resource amount calculated by the available resource amount calculating means being larger than a first predetermined value, so that the computer is to be allocated to a resource-lacking application that has a resource amount calculated by the available resource amount calculating means being less than a second predetermined value.

According to the present invention, it is possible to manage computers which are assigned to each application, so that lowering of service level of each application can be prevented.

BRIEF DESCRIPTION OF THE DRAWINGS

FIG. 2 is an illustration showing an application configuration management TL 131 schematically.

FIG. 3 is an illustration showing a resource management TL 132 schematically.

FIG. 4 is an illustration showing a metric information management TL 133 schematically.

FIG. 5 is an illustration showing a margin ratio management TL 134 schematically.

FIG. 6 is an illustration showing an adjustment plan management TL 135 schematically.

DETAILED DESCRIPTION OF THE PREFERRED EMBODIMENTS

Preferred embodiments of the present invention will be explained in the following.

Figure 1:
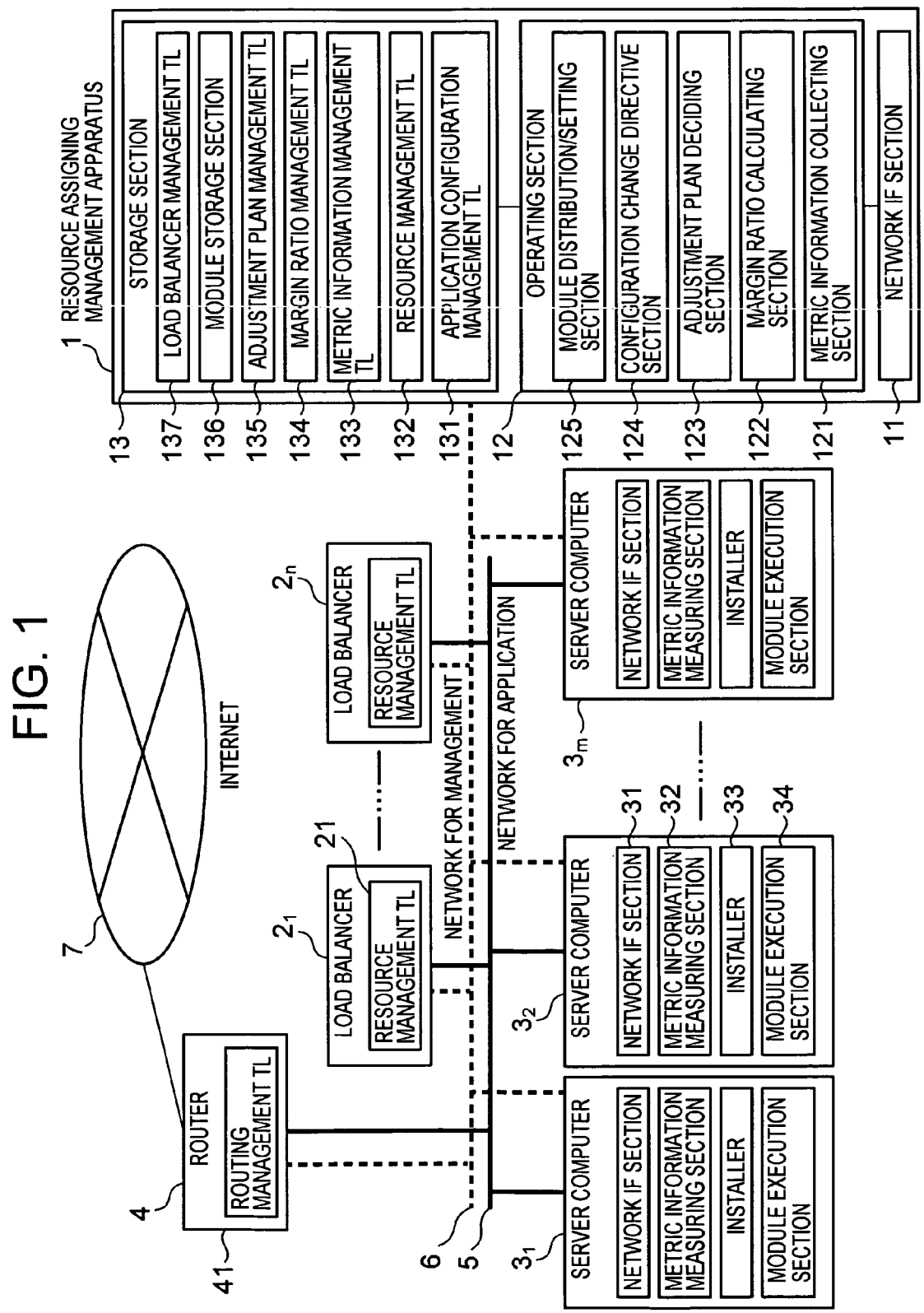
FIG. 1 is a schematic diagram showing a resource assigning management system to which one embodiment of the present invention is applied.

FIG. 1 is a schematic diagram of a resource assigning management system to which one embodiment of the present invention is applied.

As illustrated, the resource assigning management system according to the present embodiment includes a resource assigning management apparatus 1, multiple load balancers $2_1$ to $2_n$ (hereinafter, simply referred to as "load balancer 2"), multiple server computers $3_1$ to $3_m$ (hereinafter, simply referred to as "server computer 3"), and router 4 which is connected to the Internet 7.

The resource assigning management apparatus 1, the load balancers 2, the server computers 3, and router 4 are connected to one another via network for application 5 and network for management 6. The network for application 5 is a network which is used to allow the server computers 3 to render a service by the application to a client terminal (not illustrated) which is connected to the Internet 7. The network for management 6 is a network which is used by the resource assigning management apparatus 1 for maintenance/administration of the load balancers 2, the server computers 3, and the router 4. The network for application 5 and the network for management 6 may be established to be physically different from each other using separate cables, or they may be established to be logically different from each other on the same cable.

The router 4 has a routing management TL (table) 41 which stores a correspondence between global IP address and local IP address, as to each of the load balancers 2. When the router 41 receives a request from the client terminal (not illustrated) via the Internet, the router 4 transmits to the load balancer 2 having the local IP address being associated with the global IP address according to the routing TL 41, the global IP address having been designated as a destination of the request. In addition, the router 4 transmits via the Internet 7 a processing result of the request received from the load balancer 2, to the client terminal (not illustrated) which is a sending source of the request. Since other functions of the router 4 are the same as those of already-existing routers, detailed explanations thereof will not be made tediously.

The load balancer 2 forms a load distribution (horizontal scaling) system of at least one server computer 3 and an application, via the network for application 5. The load balancer 2 has a resource management TL 21 to register information of the server computer 3 which the load balancer itself is allowed to utilize. Then, via the network for application 5, the load balancer 2 sends a request having been transmitted from the router 4, to a server computer 3 under low-load conditions, out of the server computers 3 registered in the resource management TL 21, and allows thus selected server computer 3 to process the request. Further via the network for application 5, the load balancer 2 receives a processing result of the request from the server computer 3 registered in the resource management TL 21, and returns this processing result to the sending source of the request through the router 4. In addition, the load balancer 2 updates the resource management TL 21, according to an instruction received from the resource assigning management apparatus 1 via the network for management 6. Since other functions of the load balancer 2 are the same as those utilized in already-existing load distribution system, tedious explanations will not be made.

The server computer 3 processes the request received via the network for application 5, according to a module PG (program) being executed, and sends the processing result to a load balancer 2 which forms the load distribution system with the server computer 3 itself, or sends the result to another server computer 3. In addition, the server computer 3 controls execution of the module PG, according to an instruction received from the resource assigning management apparatus 1 via the network for management 6. At least one module PG constitutes an application.

As illustrated, the server computer 3 includes a network IF (interface) section 31 to establish connection with the network for application 5 and the network for management 6, metric information measuring section 32, installer 33, and module execution section 34.

The metric information measuring section 32 measures metric information of its own server computer 3, and transmits the information to the resource assigning management apparatus 1 via the network for management 6. In the present embodiment, the metric information measuring section 32 measures as the metric information, the number of request counts (receive request count) per unit time, which are received from the network for application 5. Then, the metric information measuring section 32 transmits to the resource assigning management apparatus 1 via the network for management 6, the metric information thus measured together with a computer ID which is identification information (e.g., local address) of its own server computer 3.

According to the instruction received from the resource assigning management apparatus 1 via the network for management 6, the installer 33 installs a module PG designated by the resource assigning management apparatus 1, and allows the module execution section 34 to execute the module PG. In another case, the installer 33 allows the module execution section 34 to stop the module PG being executed, and uninstalls the module PG.

The module execution section 34 executes or stops the module PG according to an instruction from the installer 33. With this function, the module execution section 34 processes the request received via the network for application 5 according to the application being executed, and transmits the processing result via the network for application 6, to a load balancer 2 which forms the load distribution system with own server computer 3, or another server computer 3.

Since other functions of the server computer 3 are the same as those of the server computer used in an already-existing load distribution system, detailed explanation will not be made tediously. It is to be noted that in the present embodiment, all the server computers 3 are assumed to have the same specification.

The resource assigning management apparatus 1 calculates, with respect to each application, a service level margin ratio of each application. Here, the service level margin ratio represents a ratio of the service level that the application is actually requested, to the service level available from the application. In the present embodiment, the service level margin ratio is represented by a ratio of total number of receive requests on each server computer 3 which is assigned to the application, to the number of requests to the application per unit time processible by each server computer 3 (processible request count).

Furthermore, the resource assigning management apparatus 1 specifies an application whose service level margin ratio indicating a lack of resources and an application whose service level margin ratio indicating excessive resources. Then, allocation of at least one of the server computers 3 which are assigned to the application having excessive resources is changed to the application which lacks resources.

As illustrated, the resource assigning management apparatus 1 includes, network IF section 11 to establish connection with the network for application 5 and the network for management 6, operating section 12, and storage section 13.

The storage section 13 includes an application configuration management TL 131, resource management TL 132, metric information management TL 133, margin ratio management TL 134, adjustment plan management TL 135, module storage section 136, and load balancer management TL 137.

The application configuration management TL 131 stores information of modules constituting each application. FIG. 2 is an illustration showing the application configuration management TL 131 schematically. As illustrated, the application configuration management TL 131 registers record 1310 with respect to each module PG. The record 1310 includes field 1311 to register an application ID which is identification information of the application including the module PG as a constituent element, which is a record target, field 1312 to register a service type indicating a type of service which is provided by the application, field 1313 to register a function provided by the module PG, field 1314 to register a module ID being identification information of the module PG, field 1315 to register whether or not multiple server computers 3 are allowed to execute the module PG in parallel, that is, multiplexing is possible, field 1316 to register the number of processible request count (number of processing counts/(minute·unit)), which is the number of requests processible per unit time by the server computer 3, when the module PG is executed by the server computer 3.

As mentioned above, in the present embodiment, it is assumed that all the server computers 3 have the same specification. Therefore, if a module PG having the module ID registered in the field 1314 of a certain record 1310 is executed, the processible request count registered in the field 1316 of this record 1310 can be applied to the entire server computers 3.

The resource management TL 132 stores information of the module PG being executed, with respect to each server computer (resource) 3. FIG. 3 is an illustration showing the resource management TL 132 schematically. As illustrated, the resource management TL 132 registers record 1320 with respect to each server computer 3. Record 1320 includes field 1321 to register a computer ID which is identification information of the server computer 3 as the record target, field 1322 to register application ID of the application to which this server computer 3 is assigned, and field 1323 to register a module ID of the module PG which is currently operating on the server computer 3. As for a record 1320 of the server computer 3 which is pooled as a resource, the fields 1322 and 1323 register "not yet assigned", indicating the server computer has not been assigned to a module PG yet.

The metric information management TL 133 stores metric information received from each server computer 3 which is executing the module PG. FIG. 4 is an illustration showing the metric information management TL 133 schematically. As illustrated, the metric information management TL 133 registers record 1330 with respect to each server computer 3 which is executing the module PG. Record 1330 includes field 1331 to register a computer ID of the server computer 3 as the record target, field 1332 to register an application ID of the application to which the server computer 3 is assigned, field 1333 to register a module ID of the module PG currently operating on the server computer 3, field 1334 to register metric information measured by the server computer 3, and field 1335 to register date and time when the record 1330 was registered. In the present embodiment, the number of requests received from the network for application 5 per unit time (number of receive requests) is measured as the metric information.

The margin ratio management TL 134 stores a service level margin ratio of each module PG. FIG. 5 is an illustration showing the margin ratio management TL 134 schematically. As illustrated, the margin ratio management TL 134 registers record 1340 with respect to each module PG. The record 1340 includes field 1341 to register an application ID of an application having the module PG as a constituent element, which is a record target, field 1342 to register a module ID of the module PG, field 1343 to register the number of units (current number of units) of the server computer 3 which is assigned to the module PG, field 1344 to register the number of units of the server computer required for processing a request to the module PG properly (without delay) (optimum number of units), field 1345 to register a service level margin ratio of the module PG, and field 1346 to register the number of units of the server computer 3 which can be released from allocation to be available for other module PG (available number of units). It is to be noted that if the available number of units registered in the field 1346 is a negative number, this value indicates the number of units of the server computer 3 being a shortfall.

The adjustment plan management TL 135 stores information regarding the module PG before and after the allocation change of each server computer 3, whose allocation to the module PG has been changed. FIG. 6 is an illustration showing the adjustment plan management TL 135 schematically. As illustrated, the adjustment plan management TL 135 includes field 1351 to register a computer ID of the server computer 3, field 1352 to register information of application before allocation change, that is, the module ID of the module PG to which the server computer 3 has been assigned before the allocation change, and the application ID of the application having this module PG as a constituent element, field 1353 to register information of application after allocation change, that is, the module ID of the module PG to which the server computer 3 is now assigned after the allocation change, and the application ID of the application having this module PG as a constituent element, field 1354 which registers date and time when the allocation change is planned (adjustment date and time), and a reflection flag 1355. It is to be noted that if the module ID and the application ID in the field 1352 indicate "not yet assigned", it means that the server computer 3 as a target of the record has been pooled as a resource before the allocation change. The reflection flag 1355 registers a flag indicating whether or not the contents of the record 1350 have already been reflected on the resource management TL 132.

The module storage section 136 registers each module PG, in such a manner that the module PG is associated with a module ID and an application ID of the application which has the module PG as a constituent element.

In addition, the load balancer management TL 137 stores, as to each application, an application ID of the application, and a load balancer ID which is identification information (e.g., local address) of the load balancer 2 which processes this application, in such a manner as being associated with each other.

The operating section 12 includes metric information collecting section 121, margin ratio calculating section 122, adjustment plan deciding section 123, configuration change directive section 124, and module distribution/setting section 125.

The metric information collecting section 121 receives via the network for management 6, metric information from each server computer 3 which is executing the module PG, and updates the metric information management TL 133 based on the metric information thus received. Specifically, the metric information collecting section 121 receives the metric information from the server computer 3, searches the resource management TL 132 for a record 1320 having the computer ID of the server computer 3. Next, the metric information collecting section 121 adds a new record 1330 to the metric information management TL 133, and registers into this record, computer ID of the server computer 3, application ID and module ID registered in the record 1320 retrieved from the resource management TL 132, and metric information received from the server computer 3, together with the registration date and time.

The margin ratio calculating section 122 uses the application configuration management TL 131, resource management TL 132, and metric information management TL 133, to calculate as to each module PG, current number of units, optimum number of units, service level margin ratio, and available number of units. Then, the margin ratio calculating section 122 updates each record 1340 in the margin ratio management TL 134, with the current number of units, optimum number of units, service level margin ratio, and available number of units, which have been calculated for the module PG having the module ID registered in the field 1342 of the record 1340.

The adjustment plan decoding section 123 determines, based on the margin ratio management TL 134, a server computer 3 whose allocation is to be changed, and registers in the adjustment plan management TL 135, a record 1350 which describes information regarding the module PG before and after the allocation change of thus determined server computer 3.

According to the adjustment plan management TL 135, the configuration change directive section 124 changes settings of the load balancer 2 so as to change the module PG to which the server computer 3 is allocated, and also to use the server computer 3 that is allocated to the module PG whose allocation has been changed. In addition, the configuration change directive section 124 updates the resource management TL 132, and reflects the changed details to the resource management TL 132.

Then, according to the instruction from the configuration change directive section 124, the module distribution/setting section 125 accesses the server computer 3 via the network for management 6 and instructs the server computer 3 to uninstall the module PG. As an alternative, the module distribution/setting section 125 reads out a module PG from the module storage section 135, sends the module PG thus read-out to the server computer 3, and instructs the server computer to install the module PG. As another alternative, the module distribution/setting section 125 accesses the load balancer 2 via the network for management 6, and updates information of the server computer 3 which executes the module PG registered in the resource management TL 21.

Figure 7:
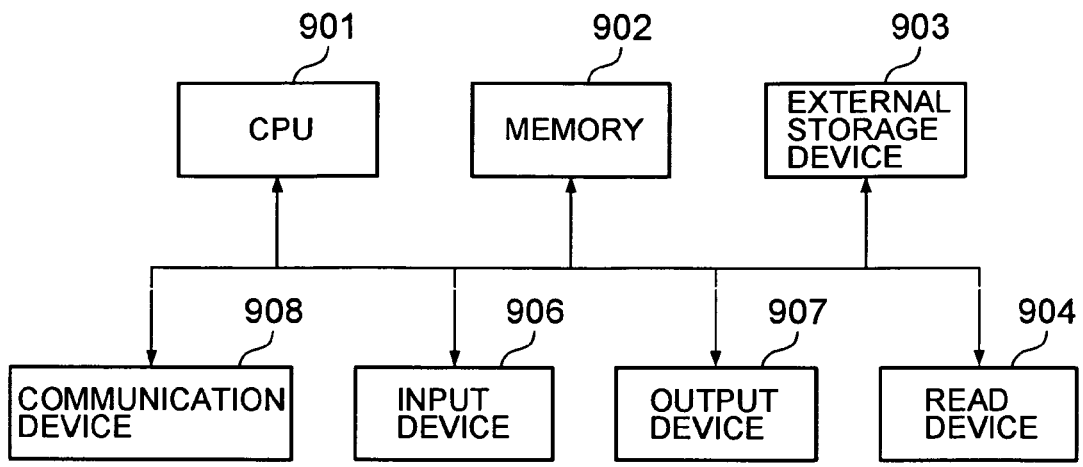
FIG. 7 is a diagram showing a hardware configuration example of the resource assigning management apparatus 1.

As shown in FIG. 7, as a way of example, the resource assigning management apparatus 1 having the configuration as described above can be implemented when a CPU executes programs loaded on a memory, in a general computer including CPU 901, memory 902, external storage device 903 such as HDD, a read device 904 which reads data from a storage medium such as CD-ROM, DVD-ROM, and IC card, input device 906 such as keyboard and mouse, output-device 907 such as monitor and printer, communication device 908 to establish connection with the network for management 6, and bus 909 which connects each devices as described above. It is also possible to configure such that those programs are downloaded to the external storage device 903 from the storage medium via the read device 904, or from the network for management 6 via the communication device 908, and then, they are loaded on the memory 902 to be executed by the CPU 901. Alternatively, it is also possible to configure such that the programs are directly loaded on the memory 902 without going through the external storage device 903, and the CPU 901 executes the programs. It is to be noted that in the case above, a storage medium serves as the storage section 13, which is mounted on the memory 902, external storage device 903, or read device 904. In addition, the communication device 908 serves as the network IF section 11.

Next, operations of the resource assigning management apparatus 1 having the above configuration will be explained.

Figure 8:
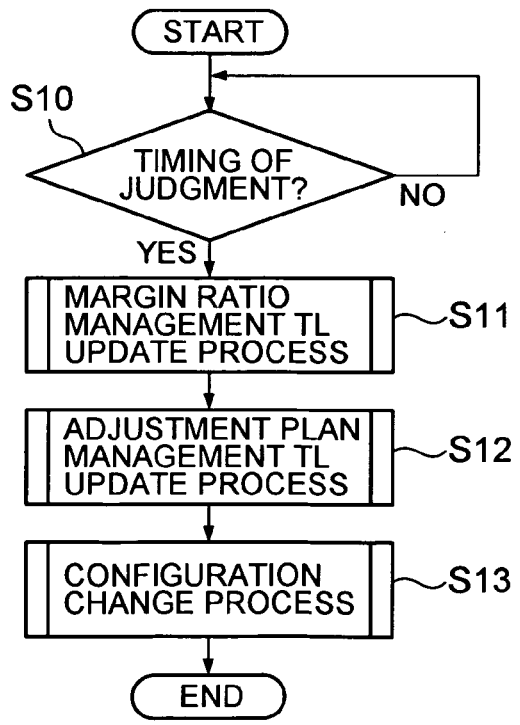
FIG. 8 is a diagram explaining an operational flow of the resource assigning management apparatus 1.

FIG. 8 is a diagram explaining an operational flow of the resource assigning management apparatus 1. Though it is not shown in this flow, the metric information collecting section 121 receives metric information from each server computer 3 via the network for management 6, as described above, and constantly performs processing to update the metric information management TL 133 with this received metric information.

In FIG. 8, by use of a built-in timer not illustrated, when the operating section 12 detects a resource assigning judgment timing such as lapse of a predetermined period of time and coming of a predetermined clock time, or accepts a resource assigning judgment instruction from a user via the input device not illustrated (Yes in S10), the operating section 12 instructs the margin ratio calculating section 122 to perform a margin ratio management TL update process.

In receipt of this instruction, the margin ratio calculating section 122 performs the margin ratio management TL update process (S11). In other words, the margin ratio calculating section 122 calculates, with respect to each module PG, current number of units, optimum number of units, service level margin ratio, and available number of units, by use of the application configuration management TL 131, the resource management TL 132, and the metric information management TL 133. Then, the margin ratio calculating section 122 updates a record 1340 in the margin ratio management TL 134, with the current number of units, optimum number of units, service level margin ratio, and available number of units, which have been calculated for the module PG having the module ID registered in the filed 1342 of the record 1340.

Figure 9:
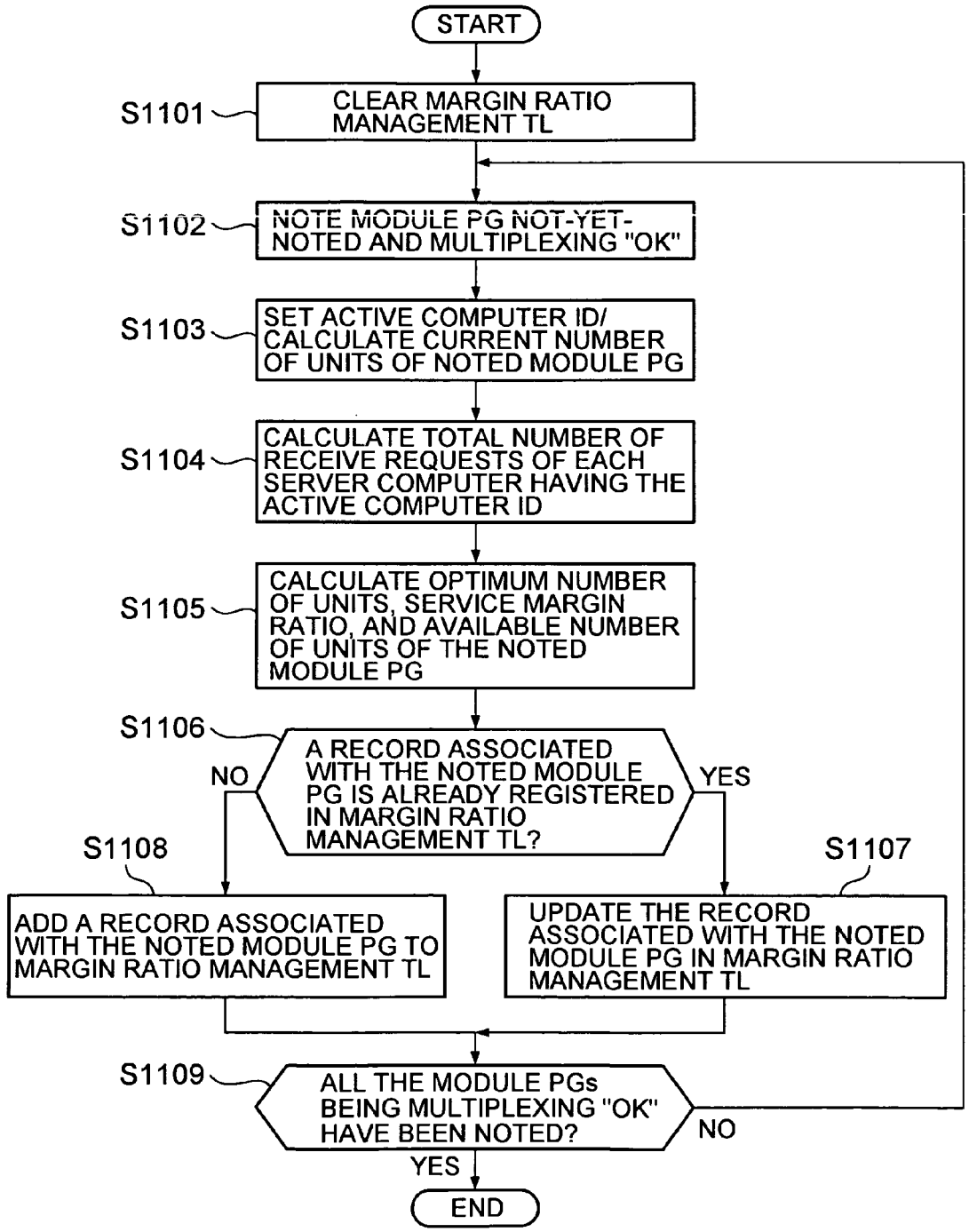
FIG. 9 is a diagram explaining an operational flow of S11 (margin ratio management TL update process) in FIG. 8.

FIG. 9 is a diagram explaining an operational flow of S11 (margin ratio management TL update process) in FIG. 8.

Firstly, the margin ratio calculating section 122 clears the registered contents in the margin ratio management TL 134 (S1101). Next, the margin ratio calculating section 122 specifies from the application configuration management TL 131, a record 1310 whose field 1315 is registered with the data "multiplexing OK" and not noted yet, and this record 1310 is set as a noted record 1310 (S1102).

Next, the margin ratio calculating section 122 searches the resource management TL 132 for a record 1320 having the application ID and the module ID of the noted record 1310, and obtains a computer ID registered in the field 1321 of each record 1320 thus searched out. Then, the computer ID registered in the field 1321 of thus searched out record 1320 is set as an active computer ID, that is, the computer ID of the server computer 3 on which the module PG specified by this application ID and the module ID of the noted record 1310 is operating currently. In addition, total number of operating computer IDs is obtained and this total number is set as a current number of units (S1103).

Next, the margin ratio calculating section 122 searches the metric information management TL 133 for all the records 1330 in which any of the active computer IDs is registered in the field 1331. Then, the total number of receive requests is obtained, the receive requests being registered as metric information in the field 1334 of each record 1330 thus searched out (S1104). Subsequently, the total number of receive requests thus obtained is divided by the processible number of counts registered in field 1316 of the noted record 1310, and all digits to the right of the decimal point are rounded up, thereby obtaining the optimum number of units. In addition, a ratio of the current number of units set in S1103 against this optimum number of units is obtained as a service level margin ratio. Furthermore, the optimum number of units is subtracted from the current number of units set in S1103, and available number of units is obtained (S1105). For instance, assuming that the application configuration management TL 131, resource management TL 132, and metric information management TL 133 are respectively just as shown in FIG. 2, FIG. 3, and FIG. 4, and the application ID and module ID of the noted record 1310 are respectively "APP_01" and "WEB_01", the processible number of counts is 20 counts/(min·unit), the current number of units is 4 (four), according to the resource management TL 132 as shown in FIG. 3, and the total number of receive requests are 150 counts/minute based on the metric information management TL 133 as shown in FIG. 4. Since (total number of receive requests: 150)/(processible count 20)=7.5, the optimum number of units is 8 (eight), the service level margin ratio is ((current number of units: 4)/(optimum number of units: 8)=50%, and the available number of units is (current number of units: 4)−(optimum number of units: 8)=−4 units, that is, resource shortages of 4 units.

Next, the margin ratio calculating section 122 checks whether or not a record (update target record) 1340 is registered in the margin ratio management TL 134, the record having the application ID and module ID of the noted record 1310 respectively registered in the fields 1341 and 1342 (S1105). If the record is registered, the contents registered in the fields 1343 to 1346 of the update target record 1340 are updated with the current number of units set in S1103, the optimum number of units, service level margin ratio, and available number of units obtained in S1105 (S1107). On the other hand, if the record is not registered, a new record 1340 is added to the margin ratio management TL 134, and the application ID and module ID of the noted record 1310, the current number of units set in S1103, the optimum number of units, service level margin ratio, available number of units obtained in S1105 are registered respectively in the fields 1341 to 1346 of this new record 1340 (S1108).

In the meantime, when the margin ratio calculating section 122 has noted all the records 1310 registered in the application configuration management TL 131 with the field 1315 being registered with "multiplexing OK" (YES in S1109), the margin ratio calculating section 122 instructs the adjustment plan deciding section 123 to perform the adjustment plan management TL update process, and ends the current processing flow. On the other hand, if there still exists a record 1310 that has not been noted yet (NO in S1109), the process returns to S1102.

Referring to FIG. 8 again, explanation will be continued. The adjustment plan deciding section 123 performs the adjustment plan management TL update process in receipt of the instruction from the margin ratio calculating section 122. In other words, based on the margin ratio management TL 134, the adjustment plan deciding section 123 decides a server computer 3 whose allocation is to be changed, and registers in the adjustment plan management TL 135, a record 1350 which describes information regarding the module PG before and after the allocation change of thus decided server computer 3 (S12).

Figure 10:
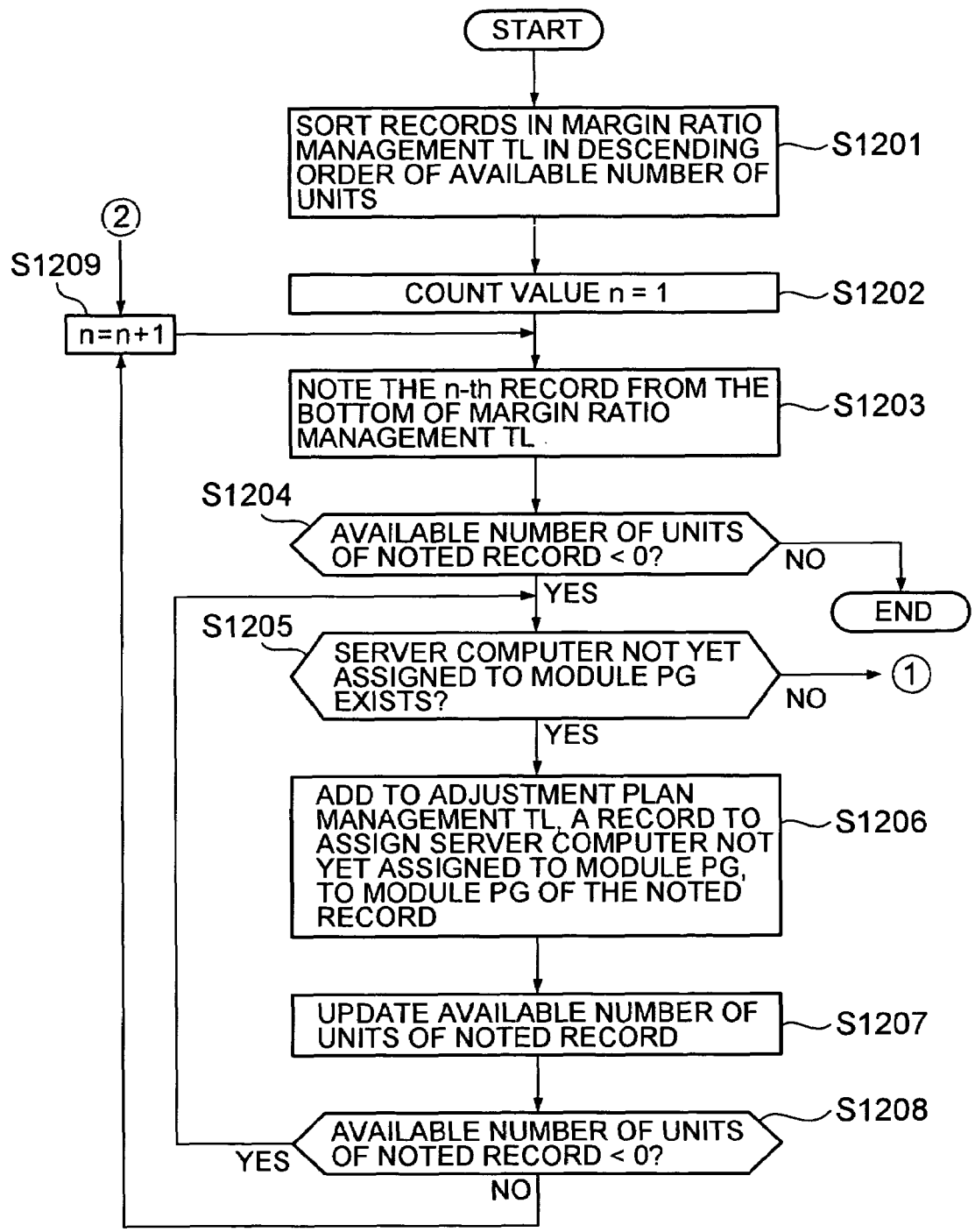
FIG. 10 is a diagram explaining an operational flow of S12 (adjustment plan management TL update process) in FIG. 8.
Figure 11:
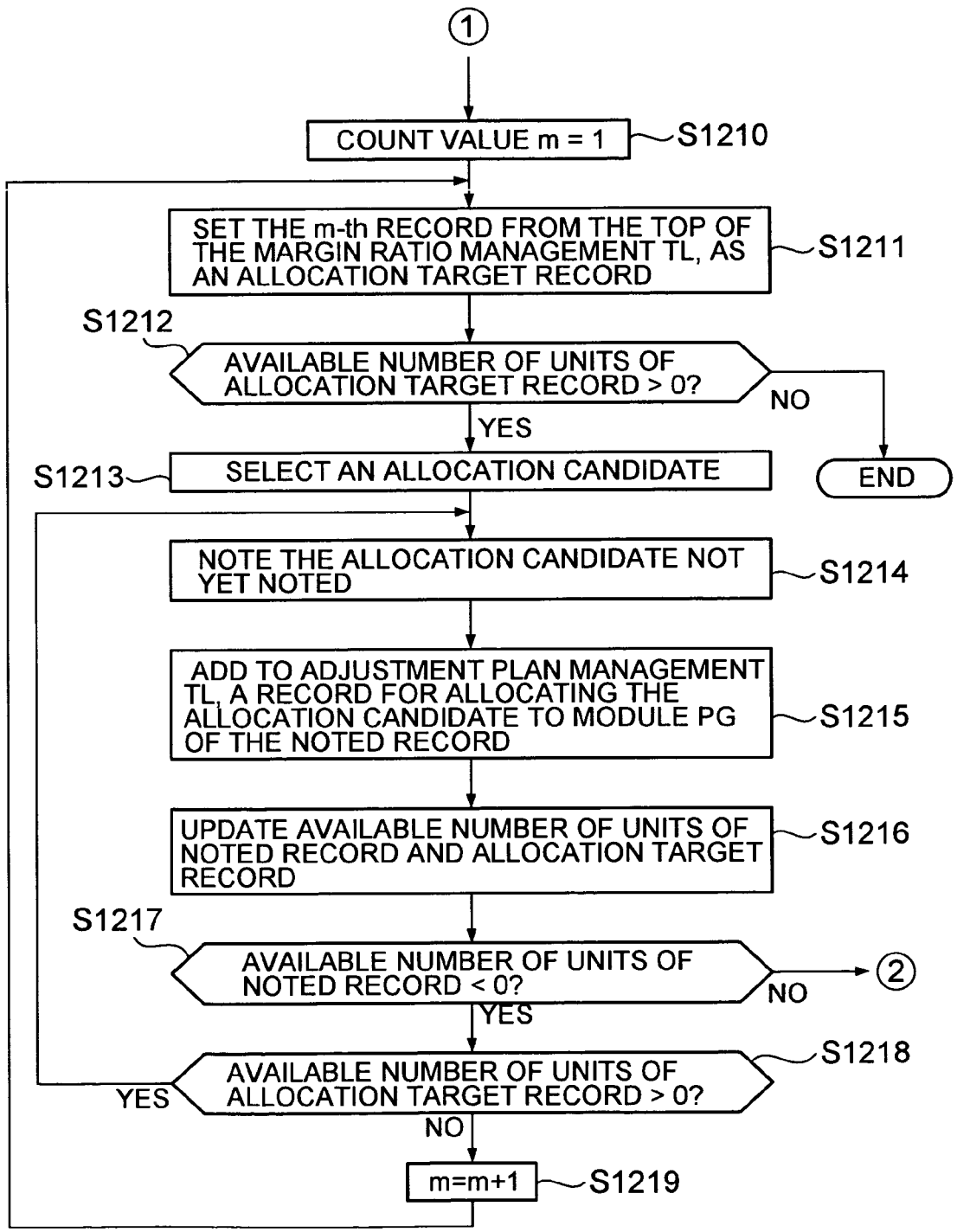
FIG. 11 is a diagram explaining an operational flow of S12 (adjustment plan management TL update process) in FIG. 8.

FIG. 10 and FIG. 11 are diagrams explaining the operational flows (adjustment plan management TL update process) of S12 in FIG. 8.

At first, the adjustment plan deciding section 123 sorts the records 1340 registered in the margin ratio management TL 134, in descending order according to the available number of units in the field 1346 (S1201). In addition, the counter value n is set to 1 (one) (S1202).

Next, the adjustment plan deciding section 123 specifies the n-th record 1340 from the bottom of the records 1340 having been sorted, which are registered in the margin ratio management TL 134, and sets this specified record 1340 as a noted record 1340 (S1203). Then, the adjustment plan deciding section 123 checks whether or not the available number of units registered in the field 1346 of the noted record 1340 is a negative value (S1204). If it is a negative value (YES in S1204) the processing proceeds to S1205. Otherwise, that is, if the available number of units is equal to zero or more (NO in S1204), it indicates that additional allocation of the server computer 3 has been completed for the entire module PGs which were lacking in resources. In the above case, the adjustment plan deciding section 123 instructs the configuration change directive section 124 to perform configuration change process, and ends the current flow.

In S1205, the adjustment plan deciding section 123 refers to the resource management TL 132, and searches the table for a record 1320, satisfying the condition that the application ID and module ID in the fields 1322 and 1323 are both "not assigned yet" and the record 1320 registers a computer ID in the field 1321, this computer ID having not been registered as a record 1350 in the adjustment plan management TL 135 yet (destination of allocation has not been decided yet).

If such a record 1320 as described above does not exist (NO in S1205), the module PG is operating on any of all the server computers 3, or even if there exists a server computer 3 on which the module PG is not operating, it is scheduled that this server computer 3 will be allocated to the module PG. In this case, the process shifts to S1210.

On the other hand, if such a record 1320 exists (YES in S1205), it indicates that the module PG is not operated on the server computer 3 having the computer ID registered in this record 1320, and allocation to the module PG is not scheduled either. In this situation, the adjustment plan deciding section 123 adds a new record 1350 to the adjustment plan management TL 135. Then, the adjustment plan deciding section 123 registers in the field 1351 of the added record 1350, the computer ID registered in the field 1321 of the record 1320 searched out in S1205, registers in the field 1352, the application ID and module ID (here, both are "not assigned yet") registered respectively in the fields 1322 and 1323 of the record 1320 searched out in S1205, registers in the field 1353, the application ID and the module ID registered in the fields 1341 and 1342 of the noted record 1340, registers the current date and time in the field 1354, and registers in the field 1355, a reflection flag "OFF" indicating that the reflection to the resource management TL 132 has not been performed yet (S1206).

Next, the adjustment plan deciding section 123 updates the available number of units registered in the field 1346 of the noted record 1340, to a value obtained by adding 1 (one) to this available number of units (S1207). Then, the adjustment plan deciding section 123 checks whether or not the available number of units registered in the field 1346 of the noted record 1340 is a negative value (S1208). If it is a negative value (YES in S1208), it indicates that the module PG specified by the application ID and the module ID of the noted record 1340 is still lacking resources (server computer 3). Then, the process returns to S1205. On the other hand, if it is not a negative value (NO in S1208), it indicates that the module PG specified by the application ID and the module ID of the noted record 1340 has no more problem of resource shortages. In this case, the count value n is incremented by one (S1209), and then, returning to S1203, and processing shifts to the record 1340 placed at one-record higher than the noted record 1340, in the order of the sorted records 1340 which are registered in the margin ratio management TL 134.

In S1210, the adjustment plan deciding section 123 sets the count value m to 1 (one). Next, the adjustment plan deciding section 123 specifies the m-th record 1340 from the top of the sorted records 1340 which are registered in the margin ratio management TL 134, and sets this record 1340 as an allocation target record 1340 (S1211).

Next, the adjustment plan deciding section 123 checks whether or not the available number of units registered in the field 1346 of the allocation target record 1340 is a positive value (equal to 1 or more) (S1212). If it is a positive value (YES in S1212) the processing proceeds to S1213. If it is not a positive number, that is, the available number of units is equal to 0 (zero) or less (NO in S1212), it means that as to all the module PGs having excessive resources, allocation to another module PG has been completed as to the server computers 3 corresponding to the excessive resource portion. In this case, the adjustment plan deciding section 123 instructs the configuration change directive section 124 to perform configuration change process and ends the current flow.

In S1213, the adjustment plan deciding section 123 searches the resource management TL 132 for a record 1320 having the application ID and module ID of the allocation target record 1340. In addition, as to each of the record 1320 thus searched out, the adjustment plan deciding section 123 checks the adjustment plan management TL 135 to find whether or not a record 1350 is registered which has the computer ID registered in the field 1321 of the record 1320 thus searched out, the application ID and the module ID registered in the field 1352 correspond to those of the noted record 1340, the application ID and the module ID registered in the field 1353 correspond to those of the allocation target record 1340, and the adjusted date and time registered in the field 1354 belong to the period from a predetermined time (e.g., one hour) before the current date and time up to the current date and time. If such a record 1350 as described above is registered in the adjustment plan management TL 135, the record 1320 is excluded from the allocation target in order to prevent frequent occurrences of allocation change of the server computer 3 between the same pair of applications. Then, a server computer 3 which is registered in the field 1321 of each record 1320 which remains until the end is set as an allocation candidate.

Next, the adjustment plan deciding section 123 notes an allocation candidate not yet noted out of the allocation candidates, and searches the resource management TL 132 for a record 1320 having the computer ID of this allocation candidate (S1214). Then, the adjustment plan deciding section 123 adds a new record 1350 to the adjustment plan management TL 135, registers in the field 1351 of the added record 1350, a computer ID of the allocation candidate, registers in the field 1352, the application ID and the module ID registered in the fields 1322 and 1323 of the record 1320 having the computer ID of the allocation candidate searched out in S1214, registers in the field 1353 application ID and module ID registered in the fields 1341 and 1342 of the noted record 1340, registers the current date and time in the field 1354, and registers in the field 1355, a reflection flag "OFF" indicating that reflection to the resource management TL 132 has not been performed yet (S1215).

Next, the adjustment plan deciding section 123 updates the available number of units registered in the field 1346 of the noted record 1340 to the value obtained by adding 1 (one) to the available number of units. In addition, the adjustment plan deciding section 123 updates the available number of units registered in the field 1346 of the allocation target record 1340 to a value obtained by subtracting 1 (one) from the available number of units (S1216).

Then, the adjustment plan deciding section 123 checks whether or not the available number of units registered in the field 1346 of the noted record 1340 is a negative value (S1217). If it is a negative value (YES in S1217), it indicates that the module PG specified by the application ID and the module ID of the noted record 1340 still lacks resources (server computer 3). Therefore, in this case, the processing proceeds to S1218. On the other hand, if the available number of units is not a negative value (NO in S1217) it indicates that the module PG specified by the application ID and the module ID of the noted record 1340 has no more problem of resource shortages. For this case, the count value n is incremented by one (S1209), and then, returning to S1203, processing shifts to the record 1340 placed at one-record higher than the noted record 1340, in the order of the sorted records 1340 which are registered in the margin ratio management TL 134.

In S1218, adjustment plan deciding section 123 checks whether or not the available number of units registered in the field 1346 of the allocation target record 1340 is positive value (equal to one or higher). If it is a positive value (YES in S1218), the process returns to S1214. If it is not a positive value, that is, the available number of units is equal to 0 (zero) or less (NO in S1218), the count value m is incremented by one (S1219), and then the process returns to S1212.

Referring to FIG. 8 again, explanation will be continued. When the configuration change directive section 124 receives an instruction from the adjustment plan deciding section 123 to perform the configuration change process, it performs this configuration change process, and the configuration change directive section 124 changes the module PG to be allocated to the server computer 3 and also changes the configuration of the load balancer 2 to utilize the server computer 3 to which the module PG is newly assigned. In addition, the configuration change directive section 124 updates the resource management TL 132 to reflect the changed details to the resource management TL 132.

Figure 12:
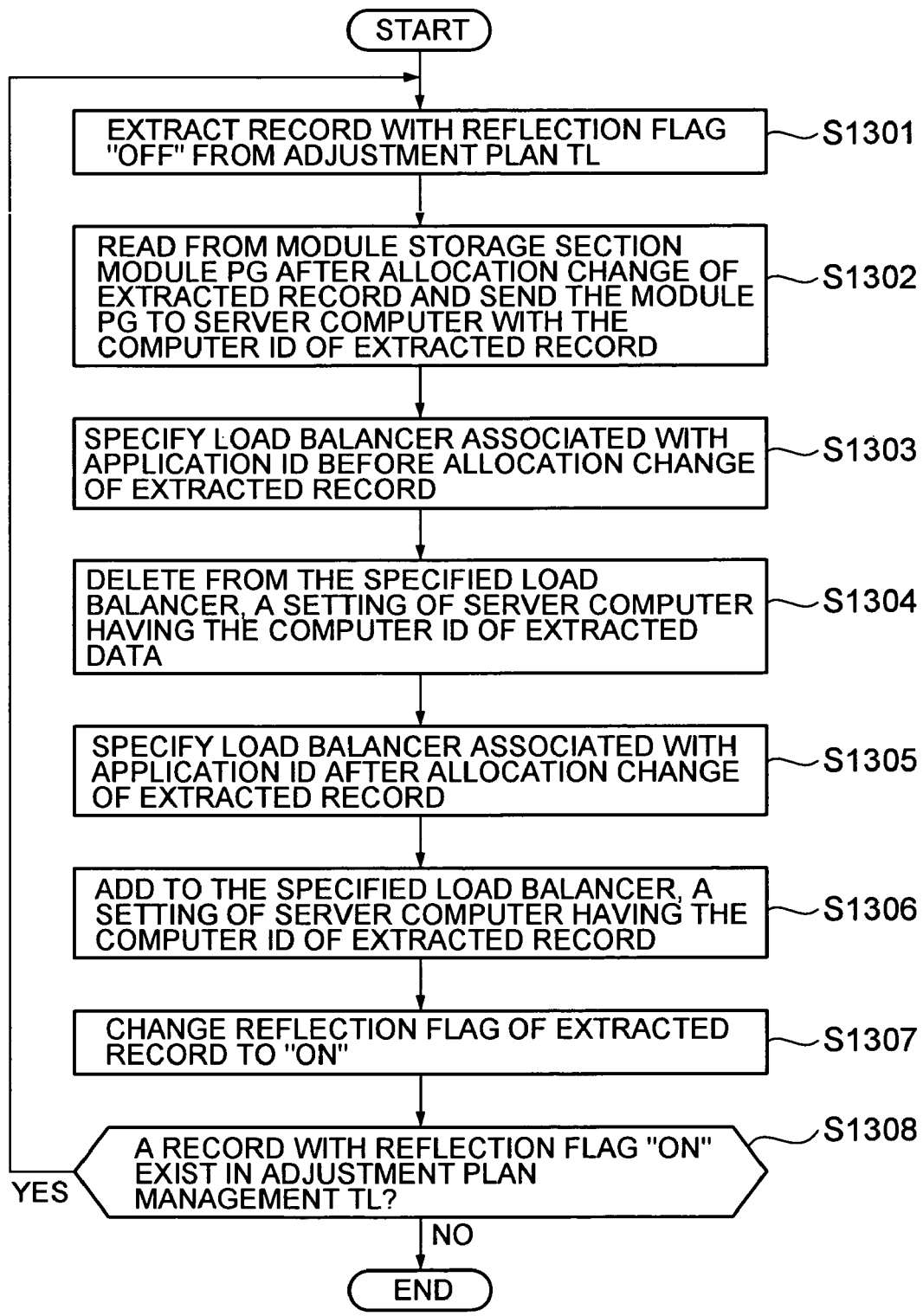
FIG. 12 is a diagram explaining an operational flow of S13 (configuration change process) in FIG. 8.

FIG. 12 is a diagram explaining an operational flow of S13 (configuration change process) in FIG. 8.

Firstly, the configuration change directive section 124 extracts from the adjustment plan management TL 135, one record 1350 which registers reflection flag "OFF" in the field 1355 (S1301).

Next, the configuration change directive section 124 notifies the module distribution/setting section 125 of the application ID and the module ID registered in the field 1353 of the record 1350 thus extracted. In receipt of this notification, the module distribution/setting section 125 reads out a module PG specified by the application ID and the module ID notified from the configuration change directive section 124, from the module storage 135, and transmits via the network for management 6, this module PG to the server computer 3 specified by the computer ID of the record 1350 thus selected (S1302). In receipt of this module PG, the installer 33 of the server computer 3 stops the current module PG which the module executive section 34 is now executing, and uninstalls this module PG. Then, the installer 33 installs the module PG newly received from the resource assignment management apparatus 1, and allows the module execution section 34 to execute this newly installed module PG.

In addition, the module distribution/setting section 125 specifies a load balancer ID registered in the load balancer management TL 136 to be associated with the application ID registered in the field 1352 of the record 1350 which has been extracted in S1301 (S1303), and accesses the load balancer 2 having this load balancer ID via the network for management 6. Then, the module distribution/setting section 125 deletes from the resource management TL 21 of the load balancer 2, a record including a combination of the computer ID registered in the field 1351 of the record 1350 extracted in S1301 and the module ID registered in the field 1352 of the same record 1350 (S1304).

Furthermore, the module distribution/setting section 125 specifies a load balancer ID registered in the load balancer management TL 136, which is associated with the application ID registered in the field 1353 of the record 1350 that has been extracted in S1301 (S1305), and accesses the load balancer 2 having the load balancer ID via the network for management 6. Then, the module distribution/setting section 125 sets in the resource management TL 21 of the load balancer 2, a record of a combination of the computer ID registered in the field 1351 of the record 1350 extracted in S1301 and the module ID registered in the field 1353 in the same record 1350 (S1306).

Then, the module distribution/setting section 125 notifies the configuration change directive section 124 that processing has been completed. In receipt of this notification, the module distribution/setting section 125 changes the reflection flag registered in the field 1355 of the record 1350 extracted in S1301, from "OFF" to "ON" (S1307).

Next, the configuration change directive section 124 checks whether or not there exists a record 1350 which registers the reflection flag "OFF" in the field 1355 (S1308), and if it exists (YES in S1308), the process returns to S1301. If it does not exist (NO in S1308), the configuration change directive section 124 ends this flow. Consequently, the flow as shown in FIG. 8 is completed entirely.

One embodiment of the present invention has been explained so far.

In the present embodiment, the resource assigning management apparatus 1 calculates, as to each application, the number of server computers 3 whose allocation can be changed to another application out of all the server computers 3 each being allocated to the application, i.e., available number of units. Then, the resource assigning management apparatus 1 changes allocation of at least one server computer 3 which is assigned to the application whose available number of units is a positive value (resources are excessive) to the application whose available number of units is a negative value (resources are lacking). Therefore, according to the present embodiment, it is possible to manage the computers which are assigned to each application, so that the lowering of the service level in each application can be prevented.

It should be understood that the present invention is not limited to the embodiment as described above, and it is susceptible of changes and modifications without departing from the scope of the invention.

For instance, in the present embodiment, a server computer 3 allocated to an application having the most excessive resources (a record 1340 having the available number of units of the largest positive value in the margin ratio management TL 134) is changed to be allocated to the application which lacks resources (a record 1340 having the available number of units of negative value in the margin ratio management TL 134). When the excessive portion of the server computer 3 allocated to the application having the most excessive resources become exhausted (the available number of units of the record 1340 associated with the application becomes zero), the allocation is changed to a server computer 3 which is allocated to the application having the second-most excessive resources. The processing above is repeated until the resource shortage is solved in the application that is lacking the resources (until the available number of units of the record 1340 associated with this application becomes zero). See adjustment plan management TL update process S12 as shown in FIG. 8. However, the present invention is not limited to the embodiment above.

The present invention may include a case that a server computer 3 allocated to an application having excessive resources is changed to be allocated to an application lacking resources, within the bounds of not causing a shortage of resources in the application which is now provided with the excessive resources.

Figure 13:
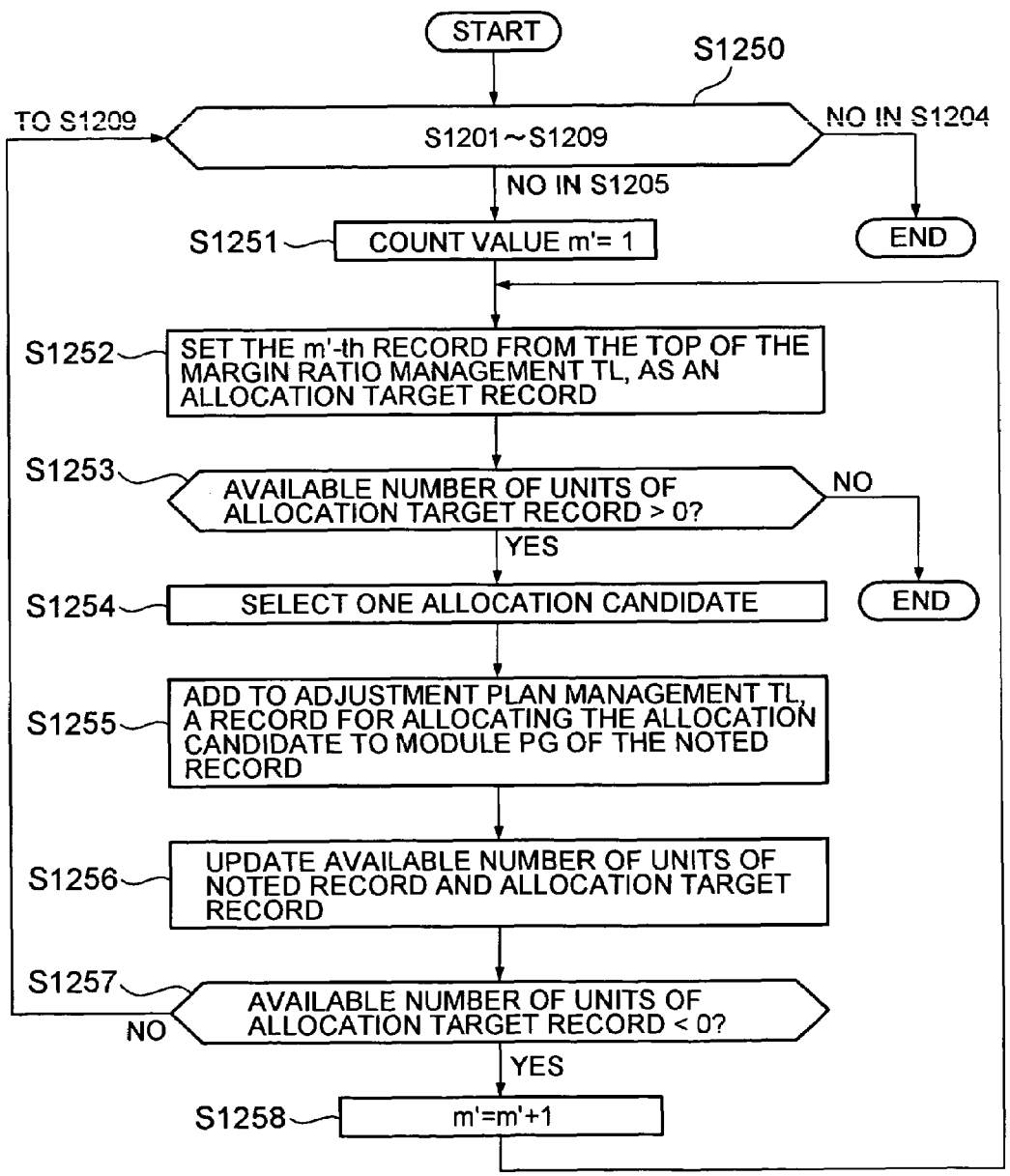
FIG. 13 is a diagram explaining a variation example of the adjustment plan management TL update process S12 as shown in FIG. 8.

FIG. 13 is a diagram for explaining a variation of the adjustment plan management TL update process S12 as shown in FIG. 8.

In FIG. 13, the adjustment plan deciding section 123 performs the same processing steps as those in S1201 to S1209 as shown in FIG. 10 (S1250). In other words, in S1203, when the available number of units registered in the field 1346 of the noted record 1340 is zero or more, the adjustment plan deciding section instructs the configuration change directive section 124 to change the configuration, and ends this processing flow. In S1205, a record 1320 having the application ID and module ID both "not assigned yet" in the fields 1322 and 1323, and a computer ID registered in the field 1321 of this record 1320 is not registered in the adjustment plan management TL 135 (i.e., allocating destination is not decided yet), the process shifts to S1251.

In S1251, the adjustment plan deciding section 123 sets the count value m' to 1 (one). Next, the adjustment plan deciding section 123 specifies the m'-th record 1340 from the top of sorted records 1340 registered in the margin ratio management TL 134, and sets this specified record as an allocation target record 1340 (S1252).

Next, the adjustment plan deciding section 123 checks whether or not the available number of units registered in the field 1346 of the allocation target record 1340 is a positive value (one ore more) (S1253) If it is a positive value (YES in S1253) the processing proceeds to S1254. Otherwise, that is, if the available number of units is zero or less (NO in S1254), it indicates that allocation of the server computer 3 corresponding to the excessive resource portion to another module PG has been completed, as to all the module PGs having excessive resources. In this case, the adjustment plan deciding section 123 instructs the configuration change directive section 124 to perform the configuration change process, and ends the current processing flow.

In S1254, the adjustment plan deciding section 123 searches the resource management TL 132 for a record 1320 having the application ID and the module ID of the allocation target record 1340. In addition, as to each record 1320 thus searched out, it is checked whether or not a record 1350 is registered in the adjustment plan management TL 135, the record 1350 having a computer ID registered in the field 1321 of the record 1320, the application ID and the module ID registered in the field 1352 agree with the application ID and the module ID registered in the noted record 1340, the application ID and the module ID registered in the field 1353 agree with the application ID and the module ID of the allocation target record 1340, and the adjusted date and time registered in the field 1354 belong to the period from a predetermined time (e.g., one hour) before the current date and time to the current date and time. If such a record 1350 as described above is registered, this record 1320 is excluded from the target in order to prevent frequent occurrences of allocation change of the server computer 3 between the same pair of applications. Then, a server computer 3 which is registered in the field 1321 of any one record 1320 remains to the end is set as an allocation candidate.

Next, the adjustment plan deciding section 123 searches the resource management TL 132 for a record 1320 having the computer ID of this allocation candidate. Then, the adjustment plan deciding section 123 adds a new record 1350 to the adjustment plan management TL1350, and registers in the field 1351 of the added record 1350, a computer ID of the allocation candidate, registers in the field 1352, the application ID and module ID registered in the fields 1322 and 1323 of record 1320 thus searched out, the record 1320 having the computer ID of the allocation candidate, registers in the field 1353 the application ID and the module ID registered in the fields 1341 and 1342 of the noted record 1340, registers the current date and time in the field 1354, and registers in the field 1355, the reflection flag "OFF", indicating that the reflection to the resource management TL 132 has not been performed yet (S1255).

Next, the adjustment plan deciding section 123 updates the available number of units registered in the field 1346 of the noted record 1340, to the value obtained by adding 1 (one) to the currently registered available number of units. In addition, the adjustment plan deciding section 123 updates the available number of units registered in the field 1346 of the allocation target record 1340 to a value obtained by subtracting 1 (one) from the current available number of units (S1256).

Then, the adjustment plan deciding section 123 checks whether or not the available number of units registered in the field 1346 of the noted record 1340 is a negative value (S1257). If it is a negative value (YES in S1257), it indicates that the module PG specified by the application ID and the module ID of the noted record 1340 still lacks resources (server computer 3). In this situation, the count value m' is incremented by 1 (one) (S1258), and the process returns to S1252. On the other hand, if it is not a negative value (NO in S1257), it indicates that the problem of resource shortage is solved for the module PG specified by the application ID and the module ID of the noted record 1340. Then, in this case, the process returns to S1250 (S1209 in FIG. 10).

By modifying the adjustment plan management TL updating process as the operation flow shown in FIG. 13, it is possible to change the allocation of the computer server 3 from an application having much more excessive resources to an application that is lacking resources.

In the embodiment described above, it is assumed that all the server computers 3 have the same specification. However, the present invention is not limited to this configuration. Each of the server computers 3 may have different specifications. In this case, the receive request count (number of receive requests) per unit time by each server computer assigned to an application is subtracted from the total number of processible requests per unit time by each server computer assigned to the application (processible request count), and then, a resource amount available from the application for another application is calculated. Then, allocation of at least one server computer assigned to the application having resource amount of a first predetermined value (e.g., +1) or more, that is, having excessive resources, is changed to an application having resource amount of a second predetermined value (e.g., −1) or less, that is, lacking of resources.

Specifically, for instance, in the field 1316 of the record 1310 in the application configuration management TL 131, a processible number of counts of each server computer 3 is registered in such a manner as being associated with the computer ID of the server computer 3. In addition, in S1103 of FIG. 9, the field 1343 of the record 1340 in the margin ratio management TL 134 registers, instead of the current number of units, total number of receive requests in each server computer 3 which is assigned to the application specified by the application ID and module ID registered in the fields 1341 and 1342. In S1105 of FIG. 9, the field 1344 registers, instead of optimum number of units, total processible number of counts of each server computer 3 which is assigned to the application specified by the application ID and module ID registered in the fields 1341 and 1342. The field 1345 registers, as a service level margin ratio, a ratio of total number of the receive requests to the total number of processible counts, and the field 1346 registers, instead of the available number of units, a value obtained by subtracting the total number of receive requests from the total number of processible counts as a new available number of counts. Here, the processible count of each server computer 3 which is assigned to the application specified by the application ID and module ID registered in the fields 1341 and 1342 can be calculated from the processible count of each server computer 3 registered in the field 1316 of the record 1310 having the application ID and module ID registered in the fields 1341 and 1342 in the application configuration management TL 131.

In addition, in S1204 and S1208 of FIG. 10, in S1217 of FIG. 11, and in S1257 of FIG. 13, it is determined whether or not the available number of units of the noted record 1340 is the second predetermined value (e.g., −1) or less, and in S1212 and S1218 of FIG. 11, and in S1253 of FIG. 13, it is determined whether or not the available number of units of the allocation target record 1340 is the first predetermined value (e.g., +1) or more.

In S1207 of FIG. 10, from the field 1316 of the record 1310 in the application configuration management TL 131 having the application ID and module ID registered in the fields 1341 and 1342 of the noted record 1340, the processible count of the server computer 3 that is allocated in S1206 is specified, and the available number of units registered in the field 1346 of the noted record 1340 is updated to a value obtained by adding the processible count thus specified to this available number of units.

In S1216 of FIG. 11, from the field 1316 of the record 1310 in the application configuration management TL 131 having the application ID and module ID registered in the fields 1341 and 1342 of the noted record 1340, the processible count of the server computer 3 that is allocated in S1216 is specified, and the available number of units registered in the field 1346 of the noted record 1340 is updated to a value obtained by adding the processible count to this available number of units. In addition, the available number of units registered in the field 1346 of the allocation target record 1340 is updated with a value obtained by subtracting the processible count thus specified from this available number of units.

In S1256 of FIG. 13, from the field 1316 of the record 1310 in the application configuration management TL 131 having the application ID and module ID registered in the fields 1341 and 1342 of the noted record 1340, the processible count of the server computer 3 that is allocated in S1255 is specified, and the available number of units registered in the field 1346 of the noted record 1340 is updated to a value obtained by adding the processible count to this available number of units. In addition, the available number of units registered in the field 1346 of the allocation target record 1340 is updated with a value obtained by subtracting the processible count thus specified from this available number of units.

In addition, in the embodiment above, metric information measuring section 32 is provided in each server computer 3, and the metric information collecting section 121 of the resource assigning management apparatus 1 collects the metric information from each server computer 3. However, the present invention is not limited to the above configuration. It is possible to configure such that the metric information measuring section for measuring the metric information is provided in each load balancer 2, with respect to each module PG, and the metric information collecting section 121 in the resource assigning management apparatus 1 collects the metric information with respect to each module PG from each load balancer 2.

In the above embodiment, it is also possible to configure such that as to a specific application, even when it has excessive resources, allocation change to another application is prohibited for the computer server 3 which is allocated to this specific application. For example, the record 1310 of the application configuration management TL 131 may include an allocation prohibiting flag indicating whether or not the allocation change of the server computer 3 is accepted, which is allocated to the module PG specified by the application ID and module ID registered in the record 1310. In S1108 of FIG. 9, when a new record 1340 is added in the margin ratio management TL 134, the allocation prohibiting flag included in the noted record 1310 is placed in the new record 1340 to be added. Prior to S1211 in FIG. 11, the allocation prohibiting flag of the m-th record 1340 from the top of the sorted records 1340 in the margin ratio management TL 134 is checked. Only when the flag indicates "allocation change is permitted", the process proceeds to S1212, and when it indicates "allocation change is rejected", the process immediately shifts to S1219. Prior to S1252 in FIG. 13, the allocation prohibiting flag of the m'-th record 1340 from the top of the sorted records 1340 in the margin ratio management TL 134 is checked. Only when the flag indicates "allocation change is permitted", the process proceeds to S1253, and when it indicates "allocation change is rejected", the process immediately shifts to S1258.

In the embodiment above, it is further possible to configure such that priorities are provided to the applications respectively, and even when there are excessive resources for a certain application, allocation change of the server computer 3 allocated to this allocation, is prohibited from being allocated to the application with lower priority. For instance, the record 1310 of the application configuration management TL 131 may include a priority given to the module PG specified by the application ID and the module ID registered in this record 1310. Then, in S1108 of FIG. 9, when a new record 1340 is added in the margin ratio management TL 134, the priority included in the noted record 1310 is placed in the record 1340 that is to be added. Prior to S1211 in FIG. 11, the priority of the m-th record 1340 from the top of the sorted records 1340 in the margin ratio management TL 134 is checked. Only when the priority is lower than the priority of the noted record 1340, the process shifts to S1212, and if it is higher, the process immediately shifts to S1219. Prior to S1252 in FIG. 13, the priority of the m'-th record 1340 from the top of the sorted records 1340 in the margin ratio management TL 134 is checked. Only when the priority is lower than the priority of the noted record 1340, the process shifts to S1253, and if it is higher, the process immediately shifts to S1258.

In the embodiment as described above, the network for management 5 and the network for application 6 are separately provided. However, it is possible to share one network for both management use and application use.

In the embodiment as described above, the resource assigning management apparatus 1 distributes a module PG to the server computer 3. However, it is further possible that the server computer 3 stores the module PG in advance, and the installer 33 installs the module PG designated by the resource assigning management apparatus 1 to allow the module execution section 34 to execute this module PG.

What is claimed is:

1. A resource assigning management apparatus that determines a computer on which an application is to be operated, in a system where each of multiple applications is operated on at least one of multiple computers, and requests to the application are divided to and processed on the computers on which the application is operated, comprising, storage device storing a processing capacity value storing section which stores, with respect to each of the applications, a processing capacity value expected when the application is operated on the computer, a request throughput storing section which stores, with respect to each of the applications, a request throughput on each of the computers which are assigned to the application, an available resource amount calculating section in which a total request throughput in each of the computers that are assigned to the application, the request throughput being stored by said request throughput storing section, is subtracted from a total processing capacity value for the application of each of the computers assigned to the application, the processing capacity value being stored, with respect to each of the applications, by said processing capacity value storing section, and a thus obtained value is set as a resource amount available from the application for another application, and a configuration changing section which changes an allocation of a computer being allocated to a resource-excessive application that has a resource amount calculated, with respect to each of the applications, by said available resource amount calculating section being larger than a first predetermined value, so that the computer is to be allocated to a resource-lacking application that has a resource amount calculated by said available resource amount calculating section being less than a second predetermined value.

2. The resource assigning management apparatus according to claim 1, wherein,
   said configuration changing section changes the allocation of the computer allocated to said resource-excessive application so that the computer is allocated to said resource-lacking application, and performs processing of,
   subtracting a processing capacity value allocated to the resource-excessive application of said computer whose allocation has been changed, from an excessive resource amount being a difference between the resource amount calculated by said available resource amount calculating section for said resource-excessive application and said first predetermined value, and
   adding the processing capacity value allocated to said resource-lacking application of said computer whose allocation has been changed, to a resource shortage amount being a difference between the resource amount calculated by said available resource amount calculating section and said second predetermined value,
   said processing being repeated as to one of said resource-excessive applications, until there is no more resource shortage amount or until said excessive resource amount is exhausted, and
   when said excessive resource amount is exhausted, said processing is repeated for one of other multiple resource-excessive applications.

3. The resource assigning management apparatus according to claim 1, wherein,
   said configuration changing section changes the allocation of the computer allocated to said resource-excessive application so that the computer is allocated to said resource-lacking application, and performs processing of,
   subtracting a processing capacity value allocated to the resource-excessive application of said computer whose allocation has been changed, from an excessive resource amount being a difference between the resource amount calculated by said available resource amount calculating section for said resource-excessive application and said first predetermined value, and
   adding the processing capacity value allocated to said resource-lacking application of said computer whose allocation has been changed, to a resource shortage amount being a difference between the resource amount calculated by said available resource amount calculating section and said second predetermined value,
   said processing being repeated as to each of multiple resource-excessive applications having said excessive resource amount, until there is no more resource shortage amount.

4. The resource assigning management apparatus according to claim 1, wherein,
   said processing capacity value storing section stores, with respect to each application, an allocation flag indicating whether or not a computer allocated to the application is allowed to be allocated to another application, together with the processing capacity value of the computer for the application, and,
   said configuration change section does not change the allocation of the computer which is allocated to said resource-excessive application, to said resource-lacking application, if the allocation flag stored in said processing capacity value storing section, being associated with said resource-excessive application, indicates "allocation reject".

5. The resource assigning management apparatus according to claim 1, wherein,
   said processing capacity value storing section stores, with respect to each application, a priority of the application, together with the processing capacity value of the computer for the application, and,
   said configuration change section does not change the allocation of the computer which is allocated to said resource-excessive application, to said resource-lacking application, if the priority stored in said processing capacity value storing section, being associated with said resource-excessive application, is higher than the priority stored in said processing capacity value storing section, being associated with said resource-lacking application.

6. The resource assigning management apparatus according to claim 1, further comprising,
   an application distributing section which transmits said resource-lacking application to the computer whose allocation has been changed by said configuration changing section, and changes the application operated on the computer, from said resource-excessive application to said resource-lacking application.

7. A resource assigning management apparatus determining a computer on which an application is to be operated, where each of multiple applications is operated on at least one of multiple computers, and requests to the application are divided to and processed on the computers on which the application is operated,
   a storage device of said resource assigning management apparatus stores, a processing capacity value management table which stores, with respect to each of the applications, a processing capacity value expected when the application is operated on the computer, and
   a request throughput management table which stores, with respect to each of the applications, a request throughput on each of the computers which are assigned to the application, and
   an operating device of said resource assigning management apparatus performs,
   an available resource amount calculating step in which a total request throughput in each of the computers that are assigned to the application, the request throughput being stored in said request throughput management table, is subtracted from a total processing capacity value for the application of each of the computers assigned to the application, the processing capacity value being stored in said processing capacity value management table, and thus obtained value is set as a resource amount available from the application for another application, and
   a configuration changing step which changes an allocation of a computer being allocated to a resource-excessive application that has a resource amount calculated by said available resource amount calculating step being larger than a first predetermined value, so that the computer is to be allocated to a resource-lacking application that has a resource amount calculated by said available resource amount calculating step being less than a second predetermined value.

* * * * *